United States Patent [19]

McGibbon

[11] 4,409,272

[45] Oct. 11, 1983

[54] PROCESS FOR THE MANUFACTURE OF COLOR DEVELOPING MATERIAL AND PRODUCT

[75] Inventor: Graeme McGibbon, Knebworth, England

[73] Assignee: The Wiggins Teape Group Limited, Hampshire, England

[21] Appl. No.: 378,013

[22] Filed: May 13, 1982

Related U.S. Application Data

[63] Continuation of Ser. No. 151,249, May 19, 1980, abandoned.

[30] Foreign Application Priority Data

May 22, 1979 [GB] United Kingdom ................ 7917814

[51] Int. Cl.[3] .......................... B32B 5/00; B32B 7/00; B32B 21/04

[52] U.S. Cl. ...................................... 428/98; 427/144; 427/145; 427/146; 427/150; 427/326; 427/372.2; 427/397.8; 427/411; 428/537; 428/913; 428/914

[58] Field of Search ............... 427/144, 145, 146, 150, 427/326, 356, 372.2, 411, 397.8; 428/537, 98, 913, 914; 282/27.5

[56] References Cited

U.S. PATENT DOCUMENTS

| | | | |
|---|---|---|---|
| 2,699,432 | 1/1955 | Marra et al. | 427/150 |
| 3,682,682 | 8/1972 | Bosshard et al. | 162/162 |
| 3,753,761 | 8/1973 | Sugahara et al. | 427/146 |
| 3,856,553 | 12/1974 | Hayashi et al. | 427/150 |
| 3,963,852 | 6/1976 | Baxter | 427/146 |
| 4,020,261 | 4/1977 | Oda et al. | 427/150 |
| 4,047,738 | 9/1977 | Isaac et al. | 427/150 |

FOREIGN PATENT DOCUMENTS

| | | | |
|---|---|---|---|
| 2636385 | 2/1978 | Fed. Rep. of Germany | 427/144 |
| 41-2373 | 2/1966 | Japan | 427/150 |
| 41-16262 | 9/1966 | Japan | 427/144 |
| 42-8811 | 4/1967 | Japan | 427/150 |
| 1326572 | 8/1973 | United Kingdom | 427/146 |
| 1417206 | 12/1975 | United Kingdom | 427/150 |
| 1443621 | 7/1976 | United Kingdom | 427/144 |
| 1533501 | 11/1978 | United Kingdom | 427/144 |

*Primary Examiner*—Sadie L. Childs

*Attorney, Agent, or Firm*—Burns, Doane, Swecker & Mathis

[57] ABSTRACT

Potassium hydroxide or another alkaline potassium compound is used to adjust the pH of an aqueous color developing clay coating composition in the manufacture of color developing material for use in pressure-sensitive or similar copying systems. This reduces the decline in reactivity with time of such material and increases initial print intensity compared with conventional material in which the corresponding sodium compound is used for pH adjustment. Especially good results are obtained where the material being coated is a paper of high acidity such as results from rosin/alum sizing.

11 Claims, 1 Drawing Figure

PROCESS FOR THE MANUFACTURE OF COLOR DEVELOPING MATERIAL AND PRODUCT

Figure 1:
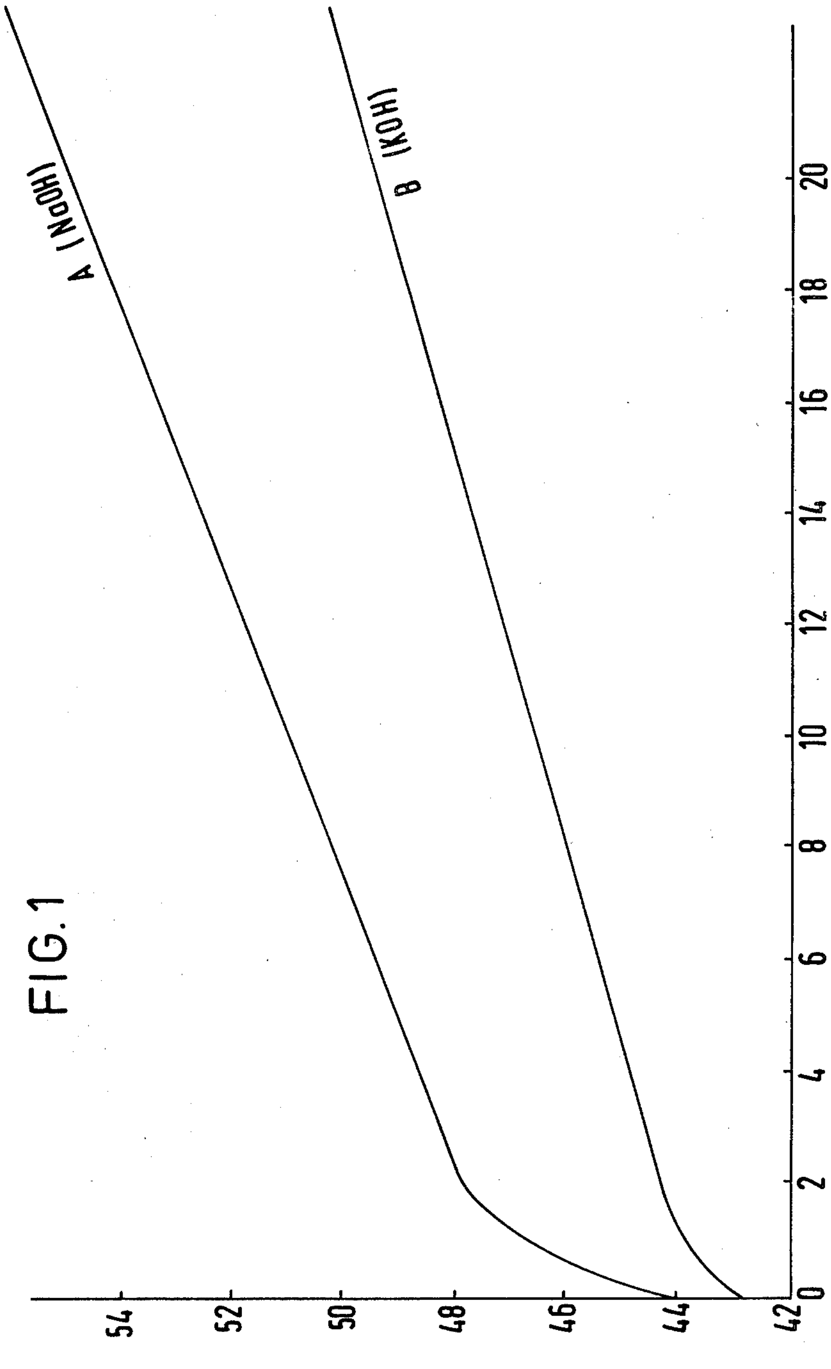

This application is a continuation of application Ser. No. 151,249 filed May 19, 1980, now abandoned.

This invention relates to a process for the manufacture of colour developing material for use in pressure-sensitive or other copying or duplicating systems and to the colour developing material so manufactured.

In one known type of pressure-sensitive copying system, usually known as a transfer system, an upper sheet is coated on its lower surface with microcapsules containing a solution of one or more colourless colour formers and a lower sheet is coated on its upper surface with a colour developing co-reactant material, for example an acidic clay. A number of intermediate sheets may also be provided, each of which is coated on its lower surface with microcapsules and on its upper surface with colour developing material. Pressure exerted on the sheets by writing or typing ruptures the microcapsules, thereby releasing the colour former solution on to the colour developing material on the next lower sheet and giving rise to a chemical reaction which develops the colour of the colour former. In a variant of this system, the microcapsules are replaced by a coating in which the colour former solution is present as globules in a continuous matrix of solid material.

In another known type of pressure-sensitive copying system, usually known as a self-contained or autogeneous system, microcapsules and colour developing co-reactant material are coated on to the same surface of a sheet, and writing or typing on a sheet placed above the thus-coated sheet causes the microcapsules to rupture and release the colour former, which then reacts with the colour developing material on the sheet to produce a colour.

The sheet material used in such systems is usually of paper, although in principle there is no limitation on the type of sheet which may be used.

A problem which has faced the art for many years is that the reactivity of the colour developing material tends to decline progressively with time. Thus the intensity of print obtained using a freshly-manufactured colour developing sheet is considerably greater than that obtained with the same sheet a few days later and this intensity is in turn considerably greater than that obtained with the same sheet a few months later. This is a serious drawback, since the colour developer sheet is frequently not used until many months after it has been manufactured. This is because the chain of distribution is frequently from the paper manufacturer to a wholesaler to a printer and thence to the end user. This means that in order to guarantee that the intensity of print will be acceptable to the end user many months after the paper has been manufactured, the manufacturer must use a greater amount of reactive material in the production of the colour developing sheets than is needed to produce a print on those sheets immediately after manufacture. Since the colour developing material is expensive, this adds significantly to the cost of pressure-sensitive copying systems.

Colour developing compositions of which the primary reactive constituent is a clay usually also contain binders, fillers, dispersants, and pH adjusters and sometimes other materials as well. Sodium hydroxide (or another alkaline sodium compound such as sodium silicate) has been used for many years both for assisting in dispersion of the clay and for adjusting the pH of the compositions.

It has now surprisingly been found that the use of an alkaline potassium compound in place of the corresponding sodium compound in colour developing clay compositions considerably reduces their decline in reactivity with time.

Accordingly, the present invention provides a process for the manufacture of colour developing material, comprising the steps of dispersing an acid-washed dioctahedral montmorillonite colour developing clay in an aqueous medium, adjusting the pH of the dispersion to an alkaline value by adding an alkaline potassium compound to the aqueous medium before during or after dispersion of the clay in the aqueous medium, the particle size of the clay being substantially unaltered whilst the clay is in the presence of the alkaline potassium compound, coating the dispersion on to a web of sheet material, and drying the thus-coated web.

The invention also resides in colour developing material manufactured by the present process. Such material may be for use in pressure-sensitive or other copying or duplicating systems.

FIG. 1 is a graph comparing the calendar intensity (vertical axis) of paper prepared with potassium hydroxide against paper prepared with sodium hydroxide over time in weeks (horizontal axis).

Dispersion of the clay in the aqueous medium may result in breaking-up of aggregates of "primary" clay particles, but not in a reduction in the size of such primary particles (as might occur, for example, if the clay was ground or pulverised). References in this specification to the particle size of the clay being substantially unaltered relate to the size of primary clay particles, and the possibility of aggregates being broken-up in the presence of the alkaline potassium compound during the present process is not therefore precluded.

Potassium hydroxide is the preferred alkaline potassium compound. Other such compounds are however well-known, and include, for example, potassium silicate and potassium carbonate. The silicate has so far been found to be more effective than the carbonate, presumably because the carbonate is a weaker base.

The web of sheet material is normally of paper, but it may be of other materials. The benefits accruing from the use of potassium hydroxide or other potassium compound are particularly marked when the paper used is acidic, for example a paper which contains up to about 1,000 or 2,000 parts per million acid (measured by Tappi Method T428 SM-67).

Substantial benefits are also obtained when the paper has a degree of acidity but also carries an alkaline material such as whiting such that it has a measured alkalinity (Tappi Method T428 SM-67) of 1,500 or more parts per million or an acidity of, for example, up to 1,000 parts per million (Tappi Method T428 SM67) or more. Such papers include typical alum/rosin sized papers. Benefits are however also obtained with so-called alkaline sized papers, e.g. paper sized with a ketene dimer material at a slightly acidic or weakly alkaline pH, i.e. in the range of about pH 6 to about pH 9.

The alkaline potassium compound is preferably used in an amount such that the pH of the colour developer composition before application is from about 7 to about 11, more preferably from 8 to 10 and most preferably about 8.5 to 9.

If desired, the alkaline potassium compound may be used as only a partial replacement for an alkaline sodium compound. Where sodium hydroxide and potassium hydroxide are used together, the pH of the coating composition is preferably in the range of from about 8.8 to about 10.2.

The composition normally also contains one or more binders, and may also contain fillers such as kaolin, additional dispersant, or other conventional additives. The binders used may be those conventionally used in clay-based colour developer compositions, e.g. styrene butadiene latices and carboxy methyl cellulose (sodium salt).

The invention will now be illustrated by the following Examples, in which the effect of using a potassium compound is contrasted with the effect of using the corresponding sodium compound.

EXAMPLE 1

Two conventional colour developing coating compositions A and B were made up at approximately 43% solids content, each composition containing acid-washed dioctahedral montmorillonite clay (Silton M AB supplied by Mizusawa Chemical Industries of Japan), kaolin (in an amount of 22% based on the total weight of montmorillonite and kaolin), and, as binders, sodium carboxymethyl cellulose and styrene-butadiene latex. Composition A contained sodium hydroxide for pH adjustment, whereas in Composition B the sodium hydroxide was replaced by potassium hydroxide. The compositions were otherwise identical.

The amounts of potassium and sodium hydroxide used were selected to give approximately the same pH (9.5), more potassium hydroxide than sodium hydroxide being needed to achieve this.

The compositions were then coated on to respective webs of the same type of alum/rosin sized base paper (of substance 49 g/m$^2$) by means of a trailing blade coater.

The intensity of print obtained using the resulting papers A and B (carrying coatings of compositions A and B respectively) as lower sheets in an otherwise conventional pressure-sensitive copying system were then measured immediately and at intervals over the next few months. The print intensities were recorded as calender intensity (C.I.) values. These were obtained by superimposing strips of microcapsule-coated and colour developing papers, passing them through a laboratory calender to rupture the capsules and thereby produce a print on the colour developing strip, measuring the reflectance of the thus coloured strip (after allowing two minutes for print development), and expressing the result as a percentage of the reflectance of an unused control colour developing strip.

Thus the lower C.I. value, the greater the print intensity. The results are set out in Table 1 below:

TABLE 1

| | C.I. value at stated time after manufacture | | | | | | | | | | | | | |
|---|---|---|---|---|---|---|---|---|---|---|---|---|---|---|
| Paper | 0 days | 3 days | 4 days | 5 days | 1 week | 1½ weeks | 2 weeks | 3 weeks | 4 weeks | 5 weeks | 6 weeks | 2 months | 3 months | 4 months | 5 months |
| A | 44 | 46 | 47 | 46 | 47 | 47 | 48 | 48 | 49 | 49 | 49 | 51 | 53 | 54 | 55 |
| B | 43 | 44 | 45 | 44 | 45 | 44 | 45 | 44 | 45 | 45 | 44 | 47 | 48 | 50 | 49 |

It will be seen that although the results exhibit a certain amount of scatter, the C.I. value rises more slowly with time for paper B than for paper A, and that a lower initial C.I. value is obtained with paper B. In order to illustrate this, the results were plotted graphically and lines of best fit were obtained. These lines of best fit are shown diagrammatically on FIG. 1, which is a plot of C.I. value (vertical axis) against lapse of time (in weeks) after manufacture of the paper (horizontal axis). It can be concluded that replacement of sodium hydroxide by potassium hydroxide results in significantly better ageing and initial print intensity values.

EXAMPLE 2

This compares the ageing rates of colour developing sheets manufactured by coating colour developing compositions containing either sodium hydroxide or potassium hydroxide on to base papers of different acidity levels.

Two coating compositions A and B were made up as described for compositions A and B in Example 1, except that their solids content was approximately 42%.

The amounts of potassium hydroxide used were selected to give approximately the same pH (9.5), more potassium hydroxide than sodium hydroxide being needed to achieve this.

The compositions were then each coated on to a range of alum/rosin sized base papers of different acidity or alkalinity (obtained from a variety of sources) by means of a trailing blade coater, to give papers A and B in each case. C.I. values at various times after manufacture were then measured for each paper as described in Example 1 above, and the results were plotted graphically to obtain lines of best fit. The rise in C.I. value over a period from one to ten weeks after manufacture was then determined, and this rise was designated the ageing rate for each paper. The results are set out in Table 2 below:

TABLE 2

| Paper | | Ageing Rate | |
|---|---|---|---|
| Substance (g/m$^2$) | Acidity (ppm) | Paper A (NaOH) | Paper B (KOH) |
| 49 | 240 | 2.3 | 1.0 |
| 49 | 33 | 2.9 | 1.8 |
| 48 | 241 | 2.9 | 2.2 |
| 49 | 161 | 3.2 | 2.1 |
| 48 | 557 | 4.0 | 2.3 |
| 48 | 574 | 3.9 | 2.4 |
| 49 | 118 | 2.5 | −0.5 |
| 48 | 920 | 4.0 | 1.3 |
| 48 | 467 | 3.5 | 2.1 |
| 49 | 67 | 3.0 | 2.0 |
| 49* | 1000 | 10.5 | 5.6 |

*This paper was coated by means of a laboratory coater. The acidity figures quoted above as parts per million are based on the acid being sulphuric acid, and were determined according to Tappi Method T428 SM-67. It will be seen that the ageing rate is lower in each case for paper B (potassium hydroxide) than for paper A (sodium hydroxide).

EXAMPLE 3

This also compares the ageing rates of colour developing sheets manufactured by coating colour developing compositions containing either sodium hydroxide or potassium hydroxide on to different alum/rosin sized base papers. In this case however, the base papers all carried whiting as a loading and/or as a pre-coat, which affects the measured acidity or alkalinity of the paper. The same coating compositions were used as were used in Example 2, and the procedure was as described in that Example. The acidity or alkalinity of the paper was measured according to Tappi Method T428 SM-67. The results were as set out in Table 3 below:

TABLE 3

| Paper | | Ageing Rate | |
|---|---|---|---|
| Substance ($g/m^2$) | Acidity (ppm) | Paper A (NaOH) | Paper B (KOH) |
| 38 | 210 | 3.1 | 1.3 |
| 47 | −300 | 3.8 | 3.1 |
| 49 | 122 | 2.5 | 1.9 |
| 38 | 151 | 3.9 | 2.5 |
| 47 | −23 | 2.6 | 2.0 |
| 47 | −228 | 3.2 | 1.8 |
| 47* | −1000 | 2.7 | 1.8 |
| 47* | −1500 | 3.5 | 2.6 |

*These papers were coated by means of a laboratory coater.

The positive apparent acidity figures quoted above as parts per million are based on the acid being sulphuric acid. A negative value indicates an apparent alkalinity, and the figures in this case are based on the alkali being calcium carbonate (i.e. whiting).

It will be seen that the ageing rate is lower in each case for paper B (potassium hydroxide) than for paper A (sodium hydroxide).

EXAMPLE 4

This illustrates the effect of using different amounts of potassium hydroxide in the colour developing composition. Results for compositions containing sodium hydroxide are included by way of comparison.

The compositions used were as described in Example 1, except that the amounts of potassium hydroxide or sodium hydroxide used were varied so as to obtain a range of pH values. The compositions were then each coated on to the same alum/rosin sized base paper, to give papers A (NaOH) and B (KOH) for each pH value. C.I. values at various times after manufacture were then measured for each paper as described in Example 1 above, and the results were plotted graphically to obtain lines of best fit. Ageing rate values were then obtained as described in Example 2. The results were as set out in Table 4 below:

TABLE 4

| pH (NaOH or KOH) | Ageing Rate | |
|---|---|---|
| | Paper A | Paper B |
| 8.0 | 3.1 | 2.4 |
| 8.5 | 2.9 | 1.8 |
| 9.0 | 2.7 | 2.4 |
| 9.5 | 2.6 | 2.5 |
| 10.0 | 2.0 | 2.5 |
| 10.2 | 2.1 | 2.5 |
| 10.8 | 2.4 | 3.0 |

It will be seen from the above that although the results exhibit considerable scatter the optimum pH for minimising ageing effects for the colour developing composition containing potassium hydroxide was about 8.5 whereas for the composition containing sodium hydroxide it was about 10.0.

EXAMPLE 5

This illustrates the use of potassium hydroxide and sodium hydroxide in combination for pH adjustment. The procedure was as described in Example 4, except that an equimolar mixture of potassium hydroxide and sodium hydroxide was used instead of the potassium hydroxide or sodium hydroxide used in Example 4. The results were as set out in Table 5 below:

TABLE 5

| pH | Ageing Rate |
|---|---|
| 7.9 | 2.2 |
| 8.5 | 2.0 |
| 9.0 | 1.7 |
| 9.5 | 2.5 |
| 10.0 | 1.1 |

It will be seen that better ageing properties were obtained than were obtained in Example 4 for sodium hydroxide alone.

EXAMPLE 6

This illustrates the effect of using potassium hydroxide in a colour developing composition utilising a different grade of colour developing clay from that used in the previous Examples in conjunction with a rosin-/alum sized base of relatively low acidity (less than 200 ppm as measured according to Tappi Method T428 SM-67, based on the acid being sulphuric acid.

Results for compositions containing sodium hydroxide are included by way of comparison.

Two conventional colour developing coating compositions A and B were made up at approximately 43% solids content, each composition containing an acid-washed dioctahedral montmorillonite clay that has previously been air-classified to remove larger particles, kaolin (in an amount of 10% based on the total weight of montmorillonite and kaolin) and sodium carboxymethyl cellulose and styrene-butadiene latex as binders. Composition A contained sodium hydroxide for pH adjustment, whereas in Composition B the sodium hydroxide was replaced by potassium hydroxide.

The actual amounts of sodium hydroxide used were selected to give a range of pH values of the composition namely 8.7, 9.3, 10.1 and 10.5.

The actual amounts of potassium hydroxide used were selected to give a range of pH values of the composition B, namely 8.9, 9.8, 10.1.

The compositions were coated on to respective webs of the same type of alum/rosin sized base paper of substance 49 $g/m^2$ and of the acidity stated above by means of a trailing blade coater to give papers A and B in each case. CI values at various times after manufacture were then measured for each paper as described in Example 1 above. The results are shown in Table 6 below:

TABLE 6

| | Paper A | | | Paper B | | |
|---|---|---|---|---|---|---|
| Composition pH | Initial CI | CI after 12 mts. | Δ | Initial CI | CI after 12 mts. | Δ |
| 8.7 | 45 | 51 | 6 | — | — | — |
| 8.9 | — | — | — | 42 | 42 | 0 |
| 9.3 | 43 | 48 | 5 | — | — | — |
| 9.8 | — | — | — | 42 | 43 | 1 |
| 10.1 | 42 | 47 | 5 | 43 | 43 | 0 |
| 10.5 | 43 | 47 | 4 | — | — | — |

It will be seen that whereas paper A declines in reactivity over this 12 month period, paper B maintains its reactivity or declines only to a very small extent.

EXAMPLE 7

This illustrates the effect of using potassium hydroxide in a colour developing composition coated on to base paper which has been sized with an alkaline size ("Aquapel" supplied by Hercules Powder Company) rather than with alum/rosin. This base paper had an extract pH of 8.5 to 8.9 when measured by both hot and cold water extraction methods. Results for compositions containing sodium hydroxide are included by way of comparison.

Two coating compositions A and B were made up at approximately 43% solids content. Composition A was a colour developing composition containing sodium hydroxide and generally as described in Example 6 except that the only binder used was styrene-butadiene latex. In composition B the sodium hydroxide was replaced by potassium hydroxide. Composition A had a pH of 9.5 and Compositon B a pH of 9.0.

The compositions were each coated on to the base paper described above by means of a trailing blade coater to give papers A (NaOH) and B (KOH). C.I. Values at various times after manufacture were then measured for each paper as described in Example 1. The ageing rate was determined graphically as for Example 2. The results are shown in Table 7 below:

TABLE 7

| | Paper A (NaOH) | Paper B (KOH) |
|---|---|---|
| Ageing rate | 0.97 | 0.44 |
| C.I. after 18 weeks ageing | 49 | 47 |

It will be seen that the ageing rate is lower for paper B than for paper A.

EXAMPLE 8

This example illustrates the effect of using potassium hydroxide on the reactivity of the colour developing composition with respect to Crystal Violet Lactone (CVL). This is perhaps the colour former most widely used in pressure-sensitive copying systems. Results for compositions containing sodium hydroxide are given by way of comparison.

Two coating compositions were made up with the same constituents as in Example 7 except that the kaolin was present in an amount of 40% based on the total weight of montimorillonite and kaolin. The compositons were coated on to two base papers of mean acidity values of about 675 ppm and about 60 ppm, as measured by Tappi Method T428 SM-67, based on sulphuric acid. The means of coating was again a trailing blade coater.

C.I. values were determined as in Example 1 except that only one colour former was present in the microcapsules in the microcapsule-coated sheet namely CVL. The reflectance of the coloured strip was measured both after 2 minutes development and 2 days development. The results obtained immediately after coating and after 9 weeks ageing are set out in Table 8 below:

TABLE 8

| | | Paper A (NaOH) (Composition) pH 9.5 | | Paper B (KOH) (Composition) pH 9.0 | |
|---|---|---|---|---|---|
| Mean paper acidity (ppm) | Development Time | IMMEDIATE C.I. | 9 WK AGED PAPER CI. | IMMEDIATE C.I. | 9 WK AGED PAPER CI. |
| 675 | 2 min | 59 | 72 | 60 | 68 |
| | 2 day | 55 | 78 | 54 | 68 |
| 60 | 2 min | 58 | 64 | 59 | 57 |
| | 2 day | 53 | 63 | 53 | 52 |

It will be seen the potassium hydroxide in composition B has a considerable effect in reducing the decline in reactivity of the colour developer sheet.

EXAMPLE 9

This illustrates the effect of using potassium silicate to adjust the pH of the coating composition alkalinity. Results for sodium silicate are given by way of comparison.

Two coating compositions were made up at approximately 40% solids content. Composition A contained sodium silicate solution (Pyramid Brand Sodium Silicate No. 120 supplied by Joseph Crosfield and Sons Ltd. of Warrington, England) in an amount sufficient to adjust the pH to 9.5. Composition B contained potassium silicate solution (Pyramid Brand Potassium Silicate No. 120 also supplied by Joseph Crosfield and Sons Ltd.) in an amount sufficient to adjust the pH to 9.0. The compositions were otherwise of the composition described in Example 1.

C.I. values were determined as for Example 1 and the results obtained (2 minute development times) are set out in Table 9 below:

TABLE 9

| | C.I. values at (2 mins. development) | |
|---|---|---|
| | Immediately after coating | 6 month aged paper |
| Paper A (Sodium silicate) | 47 | 50 |
| Paper B (Potassium silicate) | 47 | 47 |

It will be seen that the potassium silicate in composition B has a considerable effect in reducing the decline in reactivity of the colour developer sheet.

We claim:

1. A process for the manufacture of colour developing material, comprising the steps of dispersing a colour developing reactant consisting essentially of an acid-washed dioctahedral montmorillonite colour developing clay in an aqueous medium, adjusting the pH of the dispersion to an alkaline value by adding an alkaline potassium compound to the aqueous medium before, during or after dispersion of the clay in the aqueous medium, the particle size of the clay being substantially unaltered whilst the clay is in the presence of the alkaline potassium compound, coating the dispersion on to a web of sheet material, and drying the thus-coated web whereby the ageing rate of the colour developing material is less than that obtained using a like alkaline sodium compound at the same pH.

2. A process as claimed in claim 1, wherein the alkaline potassium compound is potassium hydroxide.

3. A process as claimed in claim 2, wherein the pH of the dispersion is adjusted to a value in the range 8 to 10.

4. A process as claimed in claim 2, wherein both sodium hydroxide and potassium hydroxide are used for pH adjustment and in that the pH of the dispersion is adjusted to a value of from 8.8 to 10.2.

5. A process as claimed in claim 1, wherein the web of sheet material is an acid-sized paper.

6. A process as claimed in claim 5, wherein the paper has an acidity of up to 2,000 parts per million as measured by Tappi Method T428 SM-67.

7. A process as claimed in claim 5 or 6, wherein the acid-sized paper also carries an alkaline material.

8. A process as claimed in claim 7, wherein the acid-sized paper carrying the alkaline material has an alkalinity of up to 1,500 parts per million or an acidity of up to 1,000 parts per million, in each case as measured by Tappi Method T428 SM-67.

9. A process as claimed in claim 1, wherein the web of sheet material is a neutral- or alkaline-sized paper.

10. A process as claimed in claim 1 wherein the colour reactant consists of an acid-washed montmorillonite clay.

11. Colour developing material manufactured by a process as claimed in claim 1.

* * * * *